United States Patent
Li et al.

(10) Patent No.: US 12,481,366 B2
(45) Date of Patent: Nov. 25, 2025

(54) PROCESSING METHOD AND DISPLAY DEVICE

(71) Applicant: Lenovo (Beijing) Limited, Beijing (CN)

(72) Inventors: Changfu Li, Beijing (CN); Zhixiong Liu, Beijing (CN); Dan Zhang, Beijing (CN); Song Ye, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/818,518

(22) Filed: Aug. 28, 2024

(65) Prior Publication Data
US 2025/0076987 A1    Mar. 6, 2025

(30) Foreign Application Priority Data
Aug. 31, 2023   (CN) .......................... 202311114623.7

(51) Int. Cl.
*G06F 3/01*    (2006.01)
*G06F 3/0354*  (2013.01)
*G06F 3/038*   (2013.01)

(52) U.S. Cl.
CPC .......... *G06F 3/016* (2013.01); *G06F 3/03545* (2013.01); *G06F 3/03547* (2013.01); *G06F 3/0383* (2013.01)

(58) Field of Classification Search
CPC ..... G06F 3/0488; G06F 3/03545; G06F 3/041
See application file for complete search history.

(56) References Cited

U.S. PATENT DOCUMENTS 10,824,249 B2 *  11/2020  Laslo .................... G06F 3/0383
12,242,680 B2 *   3/2025  Yoshitomi ............ G06F 3/0416

* cited by examiner

*Primary Examiner* — Koosha Sharifi-Tafreshi
(74) *Attorney, Agent, or Firm* — ANOVA LAW GROUP, PLLC

(57) ABSTRACT

This application provides a control method, a first electronic device, and a storage medium. The control method is applied to the first electronic device and includes determining whether a first prerequisite condition is satisfied and controlling a vibration component of a first electronic device to vibrate in a first vibration mode; and determining whether a second prerequisite condition is satisfied and controlling the vibration component to vibrate in a second vibration mode, wherein the first vibration mode and the second vibration mode are different, the first vibration mode is based on predefined parameters, and the second vibration mode is at least based on contact parameters between the first electronic device and a second electronic device.

17 Claims, 9 Drawing Sheets

---

Determining whether a first prerequisite condition is satisfied and controlling a vibration component of a first electronic device to vibrate in a first vibration mode.    S101

Determining whether a second prerequisite condition is satisfied and controlling the vibration component to vibrate in a second vibration mode, wherein the first vibration mode and the second vibration mode are different, the first vibration mode is based on predefined parameters, and the second vibration mode is at least based on contact parameters between the first electronic device and a second electronic device.    S102

Detecting an increase in the amplitude of a first uplink signal between the first electronic device and the second electronic device, and controlling the vibration component of the first electronic device to vibrate in a first vibration mode, wherein the first uplink signal does not carry the contact parameters between the first electronic device and the second electronic device.  S1011

Determining whether a second prerequisite condition is satisfied and controlling the vibration component to vibrate in a second vibration mode, wherein the first vibration mode and the second vibration mode are different, and the second vibration mode is at least based on contact parameters between the first electronic device and a second electronic device  S102

FIG. 2

Determining that there is signal transmission established between the first electronic device and the second electronic device, and that the pressure value between the first electronic device and the second electronic device is zero; and detecting the increase in the amplitude of the first uplink signal between the first electronic device and the second electronic device.   S10111

Determining whether a second prerequisite condition is satisfied and controlling the vibration component to vibrate in a second vibration mode, wherein the first vibration mode and the second vibration mode are different, and the second vibration mode is at least based on contact parameters between the first electronic device and a second electronic device.   S102

FIG. 5

```
┌─────────────────────────────────────────────────────────┐
│ Determining that the first electronic device has switched from a first state │
│ to a second state; and detecting that the pressure value between the first   │
│ electronic device and the second electronic device is greater than the first │──S10121
│ threshold and smaller than the second threshold, wherein, in the first state,│
│ there is no signal transmission between the first electronic device and the  │
│ second electronic device, and, in the second state, there is signal          │
│ transmission established between the first electronic device and the         │
│ second electronic device.                                                    │
└─────────────────────────────────────────────────────────┘
                              │
                              ▼
┌─────────────────────────────────────────────────────────┐
│ Determining whether a second prerequisite condition is satisfied and         │
│ controlling the vibration component to vibrate in a second vibration         │──S102
│ mode, wherein the first vibration mode and the second vibration mode are     │
│ different, and the second vibration mode is at least based on contact        │
│ parameters between the first electronic device and a second electronic       │
│ device.                                                                      │
└─────────────────────────────────────────────────────────┘
```

FIG. 7

PROCESSING METHOD AND DISPLAY DEVICE

CROSS-REFERENCE TO RELATED APPLICATION

This application claims priority to Chinese Patent Application No. 202311114623.7, filed on Aug. 31, 2023, and the entire content of which is incorporated herein by reference.

TECHNICAL FIELD

The present disclosure relates to the field of control technology, specifically to a control method, a first electronic device, and a storage medium.

BACKGROUND

In order to enhance the user experience of electronic devices, vibration components are used within these devices to provide haptic vibration feedback. However, there is a delay in the vibration of the current vibration components, resulting in a less desirable user experience with the electronic devices.

SUMMARY

One aspect of the present disclosure provides a control method. The method is applied to a first electronic device. The control method includes determining whether a first prerequisite condition is satisfied and controlling a vibration component of a first electronic device to vibrate in a first vibration mode; and determining whether a second prerequisite condition is satisfied and controlling the vibration component to vibrate in a second vibration mode, wherein the first vibration mode and the second vibration mode are different, the first vibration mode is based on predefined parameters, and the second vibration mode is at least based on contact parameters between the first electronic device and a second electronic device.

Another aspect of the present disclosure provides an electronic device. The device includes a processor configured to execute an instruction set that enables the implementation of any of the control methods described above, thereby executing any of the control methods mentioned; and a vibration component configured to vibrate under the control of the processor.

The third aspect of the present disclosure provides a computer readable storage medium. The storage medium stores a computer program configured to implement any of the control methods described above. The computer program is executed by the processor to achieve any of the control methods mentioned above.

In embodiments consistent with the present disclosure, by determining whether the first prerequisite condition is satisfied, the vibration component of a first electronic device is controlled to vibrate in a first vibration mode; and by determining whether the second prerequisite condition is satisfied, the vibration component is controlled to vibrate in a second vibration mode. The first vibration mode and the second vibration mode are different. The first vibration mode is based on predefined parameters, and the second vibration mode is at least based on the contact parameters between the first electronic device and the second electronic device. This ensures that the vibration component of the first electronic device vibrates in the first vibration mode immediately, allowing the vibration to start before vibrations based on the contact parameters between the first and second electronic devices, thereby reducing vibration delays and improving the user experience of the first electronic device.

BRIEF DESCRIPTION OF THE DRAWINGS

To illustrate the technical solutions in the embodiments of the present disclosure, drawings required for the description of the embodiments are briefly described below. Obviously, the drawings described below are merely some embodiments of the present disclosure. For those skilled in the art, other drawings can be obtained based on these drawings without creative efforts.

FIG. 2 is a flowchart of a control method according to Embodiment 2 of the present disclosure;

FIG. 5 is a flowchart of a control method according to Embodiment 4 of the present disclosure;

FIG. 7 is a flowchart of a control method according to Embodiment 5 of the present disclosure;

DETAILED DESCRIPTION OF THE EMBODIMENTS

To enable those skilled in the art to better understand the technical solutions of the embodiments of the present disclosure, the technical solutions in the embodiments of the present disclosure will be clearly and completely described below in conjunction with the accompanying drawings. Obviously, the described embodiments are merely part of the embodiments of the present disclosure, not all of the embodiments. Based on the embodiments of the present disclosure, all other embodiments obtained by those skilled in the art without creative work are within the scope of the present disclosure.

Figure 1:
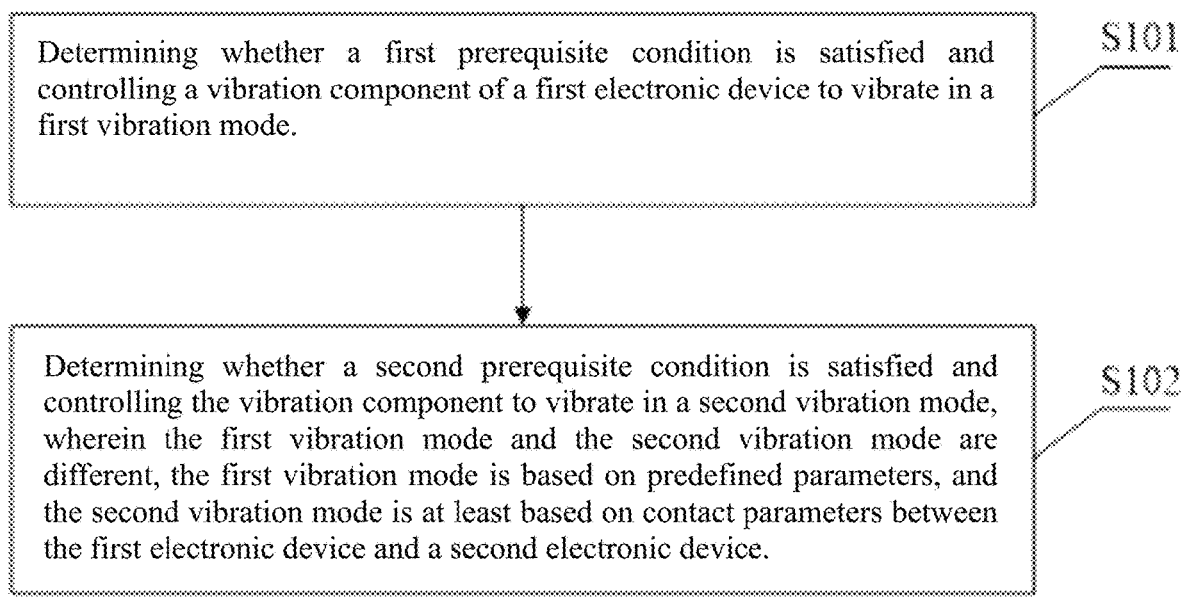
FIG. 1 is a flowchart of a control method according to Embodiment 1 of the present disclosure.

The present disclosure provides a control method. FIG. 1 is a flowchart of a control method according to Embodiment 1 of the present disclosure; this method can be applied to the first electronic device. The present disclosure does not limit the product type of the first electronic device. As shown in FIG. 1, the method can include, but is not limited to, the following steps:

At S101: determining whether the first prerequisite condition is satisfied and controlling the vibration component of the first electronic device to vibrate in a first vibration mode. The first vibration mode is based on predefined parameters.

In this embodiment, certain device functions can be achieved through the contact between the first electronic device and the second electronic device. For example, the first electronic device can transmit information to the second electronic device through such contact.

The predefined parameters are different from the contact parameters between the first electronic device and the second electronic device. The predefined parameters can be set as needed and are not limited by the present disclosure. For instance, a predefined parameter can be determined based on the history of contact parameters between the first electronic device and the second electronic device, allowing the vibration component to vibrate in the first vibration mode with a weaker vibration sensation than when vibrating based on the history of contact parameters.

The first vibration mode, based on predefined parameters, allows the vibration component to vibrate before the vibration that is based on the contact parameters between the first electronic device and the second electronic device.

In the present disclosure, the product type of the first electronic device shall not be limited. For example, the first electronic device includes, but is not limited to, a stylus pen, a smartphone, a tablet, or a laptop.

At S102: determining whether the second prerequisite condition is satisfied and controlling the vibration component to vibrate in a second vibration mode, wherein the first vibration mode and the second vibration mode are different, and the second vibration mode is at least based on the contact parameters between the first electronic device and the second electronic device.

The contact parameters between the first electronic device and the second electronic device are obtained through the contact between the first and second electronic devices.

Moreover, the contact parameters can be obtained through either or both the first and second electronic devices in situations where they are in contact with each other.

The corresponding first electronic device includes: the embodiment of a stylus pen, and the second electronic device can include, but is not limited to, a touch screen. Accordingly, the contact parameters can include, but are not limited to, at least one of the writing speed parameters and pressure sensitivity parameters of the stylus pen.

The corresponding first electronic device includes embodiments such as a mobile phone, tablet, or laptop, and the second electronic device can include, but is not limited to, any one of a mobile phone, tablet, or laptop.

In this embodiment, by determining whether the first prerequisite condition is satisfied, vibration component of the first electronic device is controlled to vibrate in a first vibration mode, and by determining whether the second prerequisite condition is satisfied vibration component of the first electronic device is controlled to vibrate in a second vibration mode. The first vibration mode and the second vibration mode are different. The first vibration mode is based on predefined parameters, and the second vibration mode is at least based on the contact parameters between the first electronic device and the second electronic device. This ensures that the vibration component of the first electronic device vibrates in the first vibration mode immediately, allowing the vibration to start before the vibration that is based on the contact parameters between the first and second electronic devices, thereby reducing vibration delay and improving the user experience of the first electronic device.

Additionally, according to the history of contact parameters between the first electronic device and the second electronic device, a predefined parameter may be determined, which allows the vibration component to have a weaker vibration sensation when vibrating in the first vibration mode than when vibrating in the second vibration mode. This provides a vibration experience that transitions from weak to strong, further enhancing the user experience of the first electronic device.

In another embodiment of the present disclosure, FIG. 2 is a flowchart of a control method provided by Embodiment 2 of the present disclosure. This embodiment primarily refines Step S101 of Embodiment 1 described above. As shown in FIG. 2, Step S101 may include, but is not limited to, the following steps:

At S1011: When an increase in the amplitude of a first uplink signal between the first electronic device and the second electronic device is detected, controlling the vibration component of the first electronic device to vibrate in a first vibration mode, wherein the first uplink signal does not carry the contact parameters between the first electronic device and the second electronic device.

Herein, the first vibration mode is based on predefined parameters.

Detecting the increase in the amplitude of the first uplink signal between the first electronic device and the second electronic device is a specific implementation of satisfying the first prerequisite condition.

The increase in the amplitude of the first uplink signal between the first electronic device and the second electronic device is a characteristic indicates that the decreasing distance between the first electronic device and the second electronic device.

Detecting the increase in the amplitude of the first uplink signal between the first electronic device and the second electronic device may include, but is not limited to, at least one of the following:

S11: Based on the characteristic value of signal strength from the second electronic device, detecting the increase in the amplitude of the first uplink signal between the first electronic device and the second electronic device, wherein the characteristic value of signal strength is used to indicate the strength of the signal detected by the second electronic device from the first electronic device.

At S11, the second electronic device may detect the strength of the signal transmitted by the first electronic device and determine the characteristic value of signal strength. The second electronic device may send the characteristic value of signal strength to the first electronic device via a transmitted signal. One embodiment of the transmitted signal is an uplink signal from the second electronic device to the first electronic device; and another embodiment is a wireless signal from the second electronic device to the first electronic device, such as a Bluetooth or Wi-Fi. Accordingly, the first electronic device, based on the characteristic value of signal strength from the second electronic device, determines the increase in signal strength and, in turn, detects the increase in the amplitude of the first uplink signal between the first electronic device and the second electronic device.

S12: Based on the signal transmitted by the second electronic device, detecting the increase in the amplitude of the first uplink signal between the first electronic device and the second electronic device.

At S12, the first electronic device may detect whether the signal strength transmitted by the second electronic device is increasing, and if so, it may determine that the amplitude of the first uplink signal between the first electronic device and the second electronic device is increasing.

It shall be understandable that, based on practical requirements, at least one of the steps S11 and S12 shall be selected to detect whether there is an increase in the amplitude of the first uplink signal between the first electronic device and the second electronic device. For example, if the first electronic device does not have the capability to detect signal strength, then S11 can be used to detect whether there is an increase in the amplitude of the first uplink signal between the first electronic device and the second electronic device. If efficiency is prioritized in detecting the increase in amplitude between the first electronic device and the second electronic device, then S12 can be used. If accuracy is prioritized in detecting the increase in amplitude between the first electronic device and the second electronic device, both steps S11 and S12 can be used.

In this embodiment, by determining the increase in the amplitude of the first uplink signal between the first electronic device and the second electronic device, the vibration component of the first electronic device is controlled to vibrate in a first vibration mode. The vibration can be initiated before vibration that is based on the contact parameters between the first electronic device and the second electronic device, especially while the distance between the first electronic device and the second electronic device is decreasing. This reduces vibration delay and improves the user experience of the first electronic device.

Figure 3:
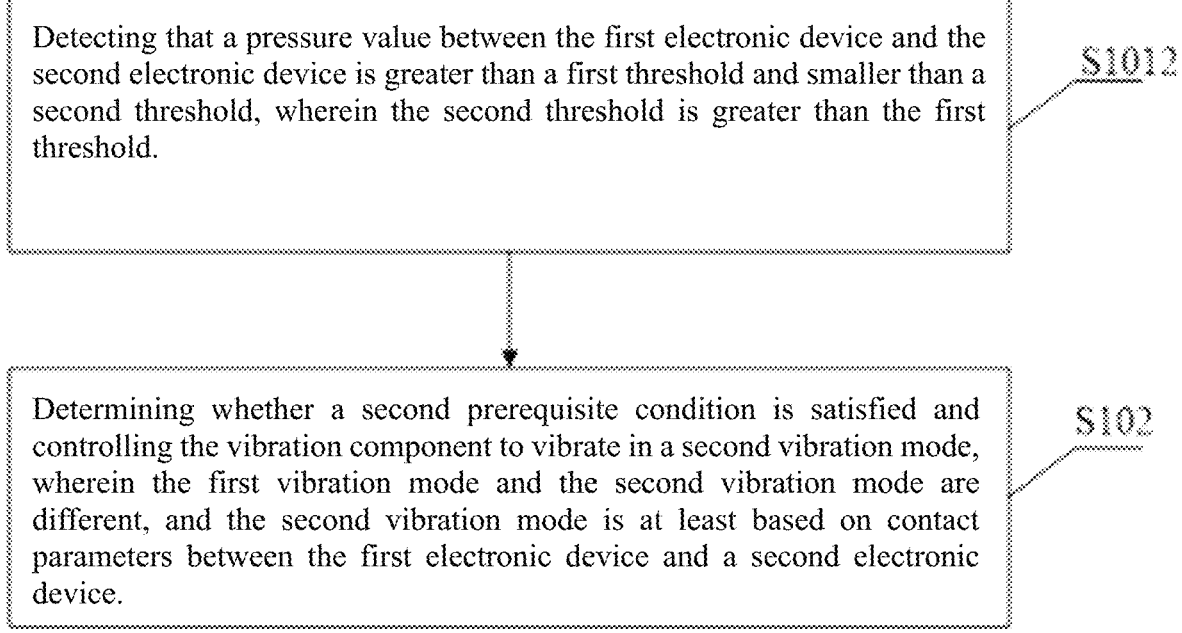
FIG. 3 is a flowchart of a control method according to Embodiment 3 of the present disclosure.

In another embodiment of the present disclosure, FIG. 3 is a flowchart of a control method according to the embodiment 3 of the present disclosure. This embodiment primarily provides a detailed solution to step S101 in embodiment 1. As shown in FIG. 3, step S101 may include, but is not limited to, the following steps:

At S1012: When it is detected that the pressure value between the first electronic device and the second electronic device is greater than the first threshold and smaller than the second threshold, the vibration component of the first electronic device is controlled to vibrate in a first vibration mode, where the second threshold is greater than the first threshold.

In this case, the first vibration mode is based on predefined parameters.

If the pressure value between the first electronic device and the second electronic device is not smaller than the second threshold, the first electronic device may control the vibration component to vibrate in a second vibration mode.

In this embodiment, the predefined parameters may include, but are not limited to, predefined vibration parameters, which at least characterize the predefined vibration intensity.

The predefined vibration parameters can be determined in advance before the first electronic device and the second electronic device contact each other, or they can be determined after the contact, based on the pressure value greater than the first threshold but smaller than the second threshold and the mapping function between the predefined vibration intensity and the pressure value.

In this case, the method of determining the predefined vibration parameters based on the pressure value greater than the first threshold and smaller than the second threshold and the mapping function between the predefined vibration intensity and the pressure value may include: determining the vibration intensity corresponding to the pressure value, which is greater than the first threshold and also smaller than the second threshold, through the mapping function between the predefined vibration intensity and the pressure value, and then using the determined vibration intensity as the predefined vibration parameter.

In this embodiment, by detecting that the pressure value between the first electronic device and the second electronic device, which is greater than the first threshold and smaller than the second threshold, then the vibration component of the first electronic device is controlled to vibrate in the first vibration mode. This ensures that there is contact between the first electronic device and the second electronic device, and that the vibration component of the first electronic device vibrates in the first vibration mode in advance, before it vibrates based on the contact parameters between the first and second electronic devices, thereby reducing vibration delay and improving the user experience of the first electronic device.

Figure 4:
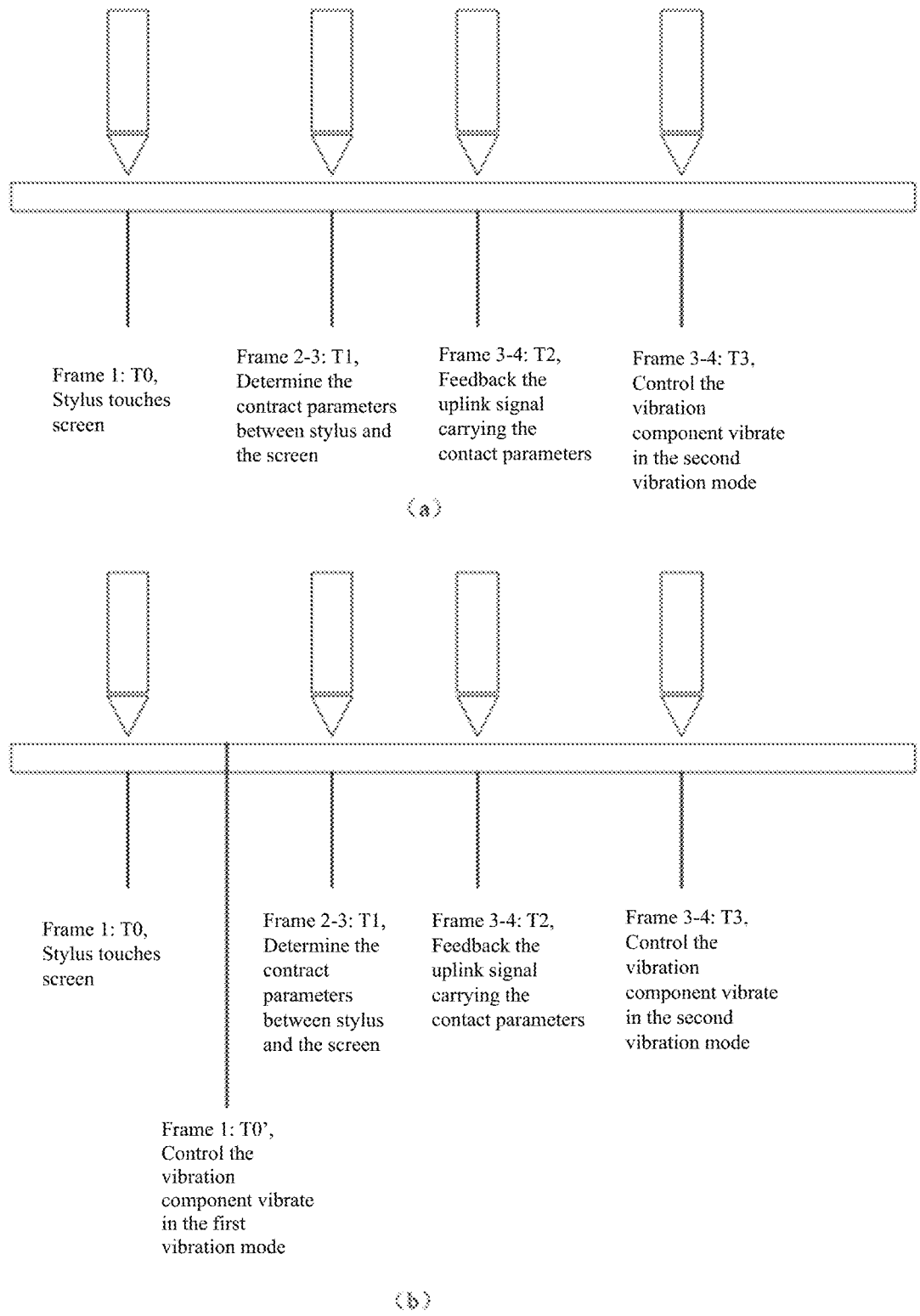
FIG. 4 is a schematic diagram comparing vibration timing sequence according to Embodiment 3 of the present disclosure.

For example, if the first electronic device is a stylus and the second electronic device is a touchscreen, and the stylus only supports the second vibration mode, the logic for controlling the vibration component of the stylus may include the following steps: T0: confirming that the stylus touches the screen; T1: detecting that the pressure value between the stylus and the screen is greater than the second threshold, and the touchscreen performs touch recognition to determine the contact parameters between the stylus and the screen; T2: providing feedback with an uplink signal carrying the contact parameters; and then T3: the stylus receives the contact parameters based on the uplink signal and controls the vibration component to vibrate in the second vibration mode, wherein the second vibration mode is based on the contact parameters. The timing sequence of T0 to T3 corresponds to the part (a) shown in FIG. 4: executing T0 at Frame 1, where the stylus touches the touchscreen; executing T1 at Frame 2-3, where the pressure value between the stylus and the screen is greater than the second threshold, and then the touchscreen performs touch recognition and determines the contact parameters between the stylus and the touchscreen. T2 is executed during Frame 3-4, wherein the uplink signal carrying the contact parameters is provided as feedback from the screen. Lastly T3 is executed at Frame 3-4, wherein the stylus receives the contact parameters based on the uplink signal and controls the vibration component to vibrate in the second vibration mode, which is based on the received contact parameters.

If the stylus comprises of both the first and second vibration modes, the logic for controlling the vibration component of the stylus may include the following steps: T0: the stylus touches the screen; T0': if the pressure value between the stylus and the touchscreen is greater than the first threshold and smaller than the second threshold, the vibration component is controlled to vibrate in the first vibration mode; T1: when the pressure value between the stylus and the touchscreen exceeds the second threshold, the touchscreen performs touch recognition and determines the contact parameters between the stylus and the touchscreen; T2: feedback an uplink signal carrying the contact parameters; and T3: the stylus receives the contact parameters in the uplink signal, and controls the vibration component to vibrate in the second vibration mode, wherein the second vibration mode is based on the contact parameters. The timing sequence of T0 to T3 corresponds to part (b) shown in FIG. 4. In the Frame 1, T0 is executed, where the stylus touches the screen. T0' is also executed in Frame 1, where if the pressure value between the stylus and the touchscreen is greater than the first threshold and smaller than the second threshold, the vibration component is controlled to vibrate in the first vibration mode. Then T1 is executed during Frame 2-3, where when the pressure value between the stylus and the touchscreen is greater than the second threshold, the touchscreen performs touch recognition and determines the contact parameters between the stylus and the touchscreen. T2 is executed in Frame 3-4, where feedback is provided with an uplink signal carrying the contact parameters. T3 is also executed in Frame 3-4, where the stylus receives the contact parameters in the uplink signal, and then controls the vibration component to vibrate in the second vibration mode, which is based on the contact parameters. As shown in part (b) of FIG. 4, the stylus can vibrate in advance in the first frame, thereby reducing vibration delay.

In another embodiment of the present disclosure, FIG. 5 is a flowchart of a control method provided in Embodiment 4 of the present disclosure, this embodiment mainly refines the process in S1011 of Embodiment 2. As shown in FIG. 5, S1011 may include, but is not limited to, the following steps:

At S10111, determining that signal transmission is able to be established between the first electronic device and the second electronic device, and that the pressure value between the first electronic device and the second electronic device is zero, an increase in the amplitude of the first uplink signal between the first electronic device and the second electronic device is detected.

Figure 6:
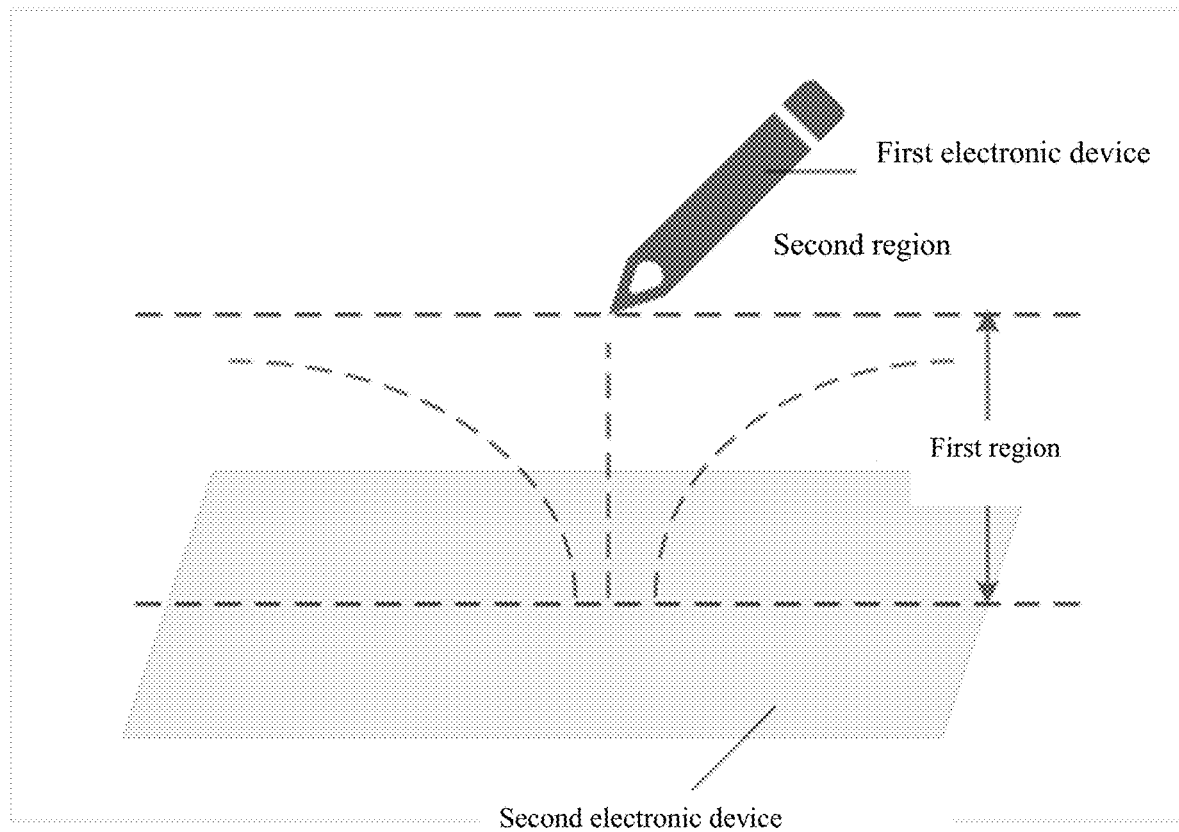
FIG. 6 is a schematic diagram of an implementation of a control method according to Embodiment 4 of the present disclosure.

In this embodiment, signal transmission between the first electronic device and the second electronic device can be established, when certain specified conditions are satisfied. These conditions may include, but are not limited to, the distance between the first electronic device and the second electronic device satisfying a predefined distance threshold. For example, as illustrated in FIG. 6, in the first region, the distance between the first electronic device and the second electronic device is satisfying the predefined distance threshold, so that a signal transmission between them can be established; whereas in the second region, the distance between the first electronic device and the second electronic device does not satisfy the predefined distance threshold, so that a signal transmission between the first electronic device and the second electronic device is not able to be established.

Setting a distance threshold for signal transmission, is able to prevent the first vibration mode from being triggered prematurely when the distance between the first electronic device and the second electronic device is relatively large, thereby reducing the occurrence of false vibrations.

It shall be understandable that, when there is contact between the first electronic device and the second electronic device, there exists a non-zero pressure value between them; and when there is no contact between the first electronic device and the second electronic device, the pressure value between them is just zero.

In this embodiment, by determining that signal transmission is able to be established between the first electronic device and the second electronic device, and that the pressure value between the first electronic device and the second electronic device is zero, and by detecting an increase in the amplitude of the first uplink signal between the first electronic device and the second electronic device, the vibration component of the first electronic device is controlled to vibrate in a first vibration mode, so that the vibration can be initiated in advance, before the first and second electronic devices make contact as the distance between them is decreasing, thereby reducing vibration delay and improving the user experience of the first electronic device.

In another embodiment of the present disclosure, FIG. 7 is a flowchart of a control method provided in Embodiment 5 of the present disclosure. This embodiment primarily describes the process in S1012 of Embodiment 3. As shown in FIG. 7. S1012 may include, but is not limited to, the following steps:

At S10121, determining that the first electronic device switches from a first state to a second state, detecting that the pressure value between the first electronic device and the second electronic device is greater than the first threshold and smaller than the second threshold, then the vibration component of the first electronic device is controlled to vibrate in the first vibration mode. In the first state, signal transmission between the first electronic device and the second electronic device cannot be established, while in the second state, signal transmission between the first electronic device and the second electronic device can be established.

In this embodiment, the second threshold is greater than the first threshold.

The occurrence of false vibrations can be reduced, by determining that the first electronic device switches from the first state to the second state, and then starting to detect whether the pressure value between the first electronic device and the second electronic device is greater than the first threshold and smaller than the second threshold. For example, if the first electronic device is a stylus and the second electronic device is a display, and if it is not determined whether the stylus has switched from the first state to the second state before detection, and if the display has a non-touch screen, then the stylus would not be able to detect that signal transmission cannot be established with the non-touch screen. In such a case, if the pressure value between the stylus and the non-touch screen is greater than the first threshold and smaller than the second threshold, the vibration component of the stylus would still be controlled to vibrate in the first vibration mode, causing a false vibration. However, if it is determined that the stylus has switched from the first state to the second state before detection, it can be confirmed that signal transmission can be established between the stylus and the display screen, indicating that the stylus is generating a pressure value with a touch screen, which ensures that the control of the stylus's vibration component to vibrate in the first vibration mode is correct.

In another embodiment of the present disclosure, a control method is provided, which is primarily a detailed explanation of the condition satisfying the second prerequisite condition in S102 of the Embodiment 1 described above. Whether the second prerequisite condition is satisfied in S102 may include, but is not limited to, at least one of the following:

At S1021, the contact parameters carried by the second uplink signal between the first electronic device and the second electronic device satisfy the parameter threshold.

The second electronic device is able to determine the corresponding contact parameters between the first electronic device and the second electronic device, and then transmit a second uplink signal to the first electronic device, where the second uplink signal carries the contact parameters.

The parametric threshold can be set as needed, and it is not limited by the disclosure of this application. For example, if the contact parameter is a pressure value, the parameter threshold can be a threshold of pressure value.

At S1021, detecting that the pressure value between the first electronic device and the second electronic device is greater than the second threshold.

More specifically, in S1021, the first electronic device can actively detect whether the pressure value between the first electronic device and the second electronic device is greater than the second threshold.

In this embodiment, if it is determined that the contact parameters carried by the second uplink signal between the first electronic device and the second electronic device satisfies the parameter threshold, and it is also determined that the pressure value between the first electronic device and the second electronic device is greater than the second threshold, then the vibration component is controlled to vibrate in the second vibration mode. This approach improves the accuracy of controlling the vibration component to vibrate in the second vibration mode.

Figure 8:
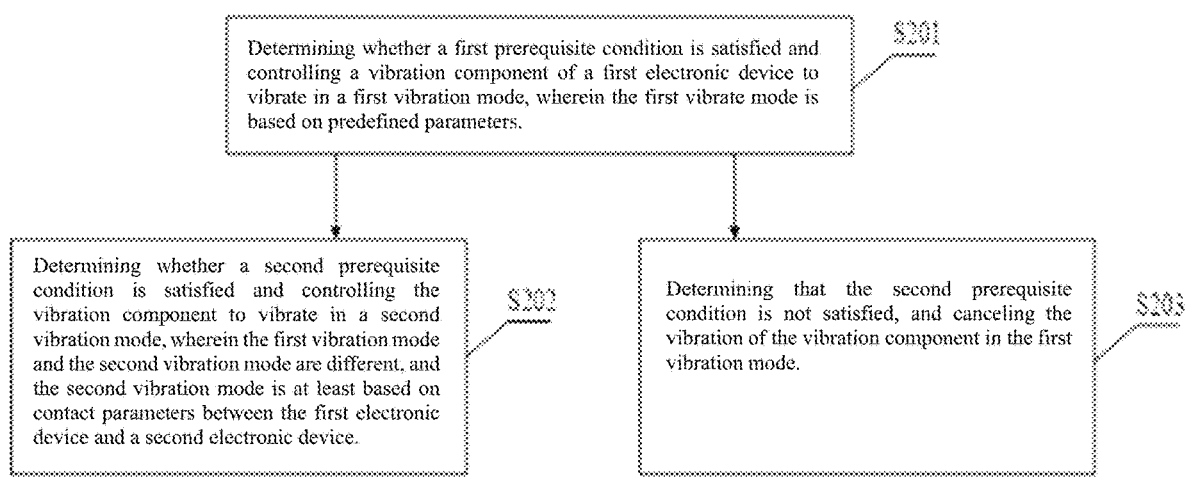
FIG. 8 is a flowchart of a control method according to Embodiment 7 of the present disclosure.

In another embodiment of the present disclosure, FIG. 8 is a flowchart of a control method according to Embodiment 7 of the present disclosure. As shown in FIG. 8, the method may include, but shall not be limited to, the following steps:

At S201, determining whether the first prerequisite condition is satisfied and controlling the vibration component of the first electronic device to vibrate in a first vibration mode, wherein the first vibration mode is based on predefined parameters.

At S202, determining whether the second prerequisite condition is satisfied and controlling the vibration component to vibrate in a second vibration mode, wherein the first vibration mode and the second vibration mode are different, and the second vibration mode is at least based on the contact parameters between the first electronic device and the second electronic device.

The detailed process and description of S201-S202 can be referred to the corresponding description of S101-S102 already mentioned in the description of Embodiment 1, so there is no necessity to repeat here.

At S203, determining that the second prerequisite condition is not satisfied, and then canceling the vibration of the vibration component in the first vibration mode.

In this embodiment, the scenario wherein the second prerequisite condition is not satisfied may include, but shall not be limited to:

At S2031, timing from the start of the vibration component vibrating in the first vibration mode, and if the passed time length satisfies the preset time threshold, detecting that the pressure value between the first electronic device and the second electronic device is not greater the second threshold.

The preset time threshold can be set as needed, and limited by the disclosure of this application.

Moreover, the scenario wherein the second prerequisite condition is not satisfied may also include, but shall not be limited to:

At S2032, the contact parameters carried by the second uplink signal between the first electronic device and the second electronic device do not satisfy the parametric threshold.

The second uplink signal between the first electronic device and the second electronic device, as well as the contact parameters it carries, can be referred to the corresponding description of S1021 already mentioned in the description of Embodiment 6, so there is no necessity to repeat here.

In this embodiment, false vibration, which is caused by the first vibration mode, can be prevented by determining that the second prerequisite condition is not satisfied and then canceling the vibration in the first vibration mode.

In another embodiment of the present disclosure, Embodiment 8 provides a control method, which is primarily the method of obtaining the predefined parameters described in Embodiment 1 mentioned above. The predefined parameters can be obtained, but shall not be limited to, the following methods:

At S21, selecting the predefined parameter corresponding to the writing type from multiple predefined parameters, based on the writing type of the first electronic device. The multiple predefined parameters correspond to various writing types of the first electronic device, and the writing parameters corresponding to different writing types are different.

The first electronic device performs writing function based on the writing parameters corresponding to its writing type.

In this embodiment, the vibration component of the first electronic device is controlled to vibrate in a first vibration mode, where the first vibration mode is based on predefined parameters corresponding to the writing type of the first electronic device. This ensures that the vibration mode matches the writing type of the first electronic device, so that it guarantees that different writing types of the first electronic device have different first vibration modes. This allows users to experience different haptic feedback while using the first electronic devices with different writing types, as a result, further improving the user experience of the first electronic device.

The present disclosure also provides a control device, which can be referred to as the control method described above.

Figure 9:
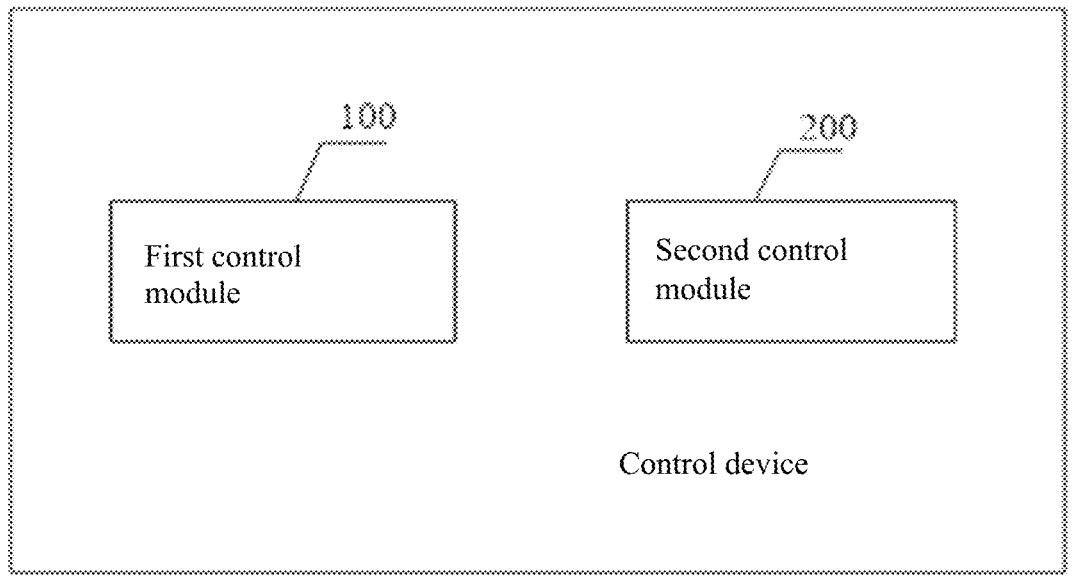
FIG. 9 is a schematic structural diagram of a control device according to the present disclosure in this application.

As shown in FIG. 9, the control device includes: a first control module 100 and a second control module 200.

The first control module 100 is configured to determine whether the first prerequisite condition is satisfied and control the vibration component of the first electronic device to vibrate in a first vibration mode, where the first vibration mode is based on predefined parameters.

The second control module 200 is configured to determine whether the second prerequisite condition is satisfied and control the vibration component to vibrate in a second vibration mode, where the first vibration mode and the second vibration mode are different, and the second vibration mode is at least based on the contact parameters between the first electronic device and the second electronic device.

In this embodiment, whether the first prerequisite condition is satisfied may include:

An increase in the amplitude of the first uplink signal between the first electronic device and the second electronic device is detected, while the first uplink signal does not carry the contact parameters between the first electronic device and the second electronic device; or The pressure value between the first electronic device and the second electronic device is detected to be greater than the first threshold and smaller than the second threshold, wherein the second threshold is greater than the first threshold.

In this embodiment, detecting an increase in the amplitude of the first uplink signal between the first electronic device and the second electronic device may include at least one of the following:

Detecting an increase in the amplitude of the first uplink signal between the first electronic device and the second electronic device, based on the characteristic value of signal strength from the second electronic device, wherein the characteristic value of signal strength is used to characterize the intensity of the signal transmitted from the first electronic device and detected by the second electronic device;

Detecting an increase in the amplitude of the first uplink signal between the first electronic device and the second electronic device, based on the signal transmitted from the second electronic device.

In this embodiment, detecting an increase in the amplitude of the first uplink signal between the first electronic device and the second electronic device may include:

Determining that signal transmission is able to be established between the first electronic device and the second electronic device, and that the pressure value between the first electronic device and the second electronic device is zero, and detecting an increase in the amplitude of the first uplink signal between the first electronic device and the second electronic device.

In this embodiment, detecting that the pressure value between the first electronic device and the second electronic device is greater than the first threshold but smaller than the second threshold may include:

Determining that the first electronic device switches from a first state to a second state, detecting that the pressure value between the first electronic device and the second electronic device is greater than the first threshold and smaller than the second threshold. In the first state, signal transmission between the first electronic device and the second electronic device is not established. In the second state, signal transmission between the first electronic device and the second electronic device is established.

In this embodiment, whether the second prerequisite condition is satisfied may include at least one of the following:

The contact parameters carried by the second uplink signal between the first electronic device and the second electronic device satisfy the parametric threshold; and Detecting that the pressure value between the first electronic device and the second electronic device is greater than the second threshold.

In this embodiment, the control device may further include:

A cancellation module, which is configured to determine the scenario wherein the second prerequisite condition is not satisfied, so that to cancel the vibration of the vibration component in the first vibration mode.

The scenario wherein the second prerequisite condition is not satisfied may include:

Timing from starting vibration of the vibration component in the first vibration mode, if the passed time length satisfies the preset time threshold, then it is detected that the pressure value between the first electronic device and the second electronic device is not greater than the second threshold; or The contact parameters carried by the second uplink signal between the first electronic device and the second electronic device do not satisfy the parametric threshold.

The predefined parameters can be obtained through the following methods:

Selecting the predefined parameters corresponding to the writing type from multiple predefined parameters, based on the writing type of the first electronic device. The multiple predefined parameters correspond to various writing types of the first electronic device, and the writing parameters are different for different writing types.

The present disclosure also provides an embodiment of a first electronic device, corresponding to the embodiment of the control method provided in this application.

Figure 10:
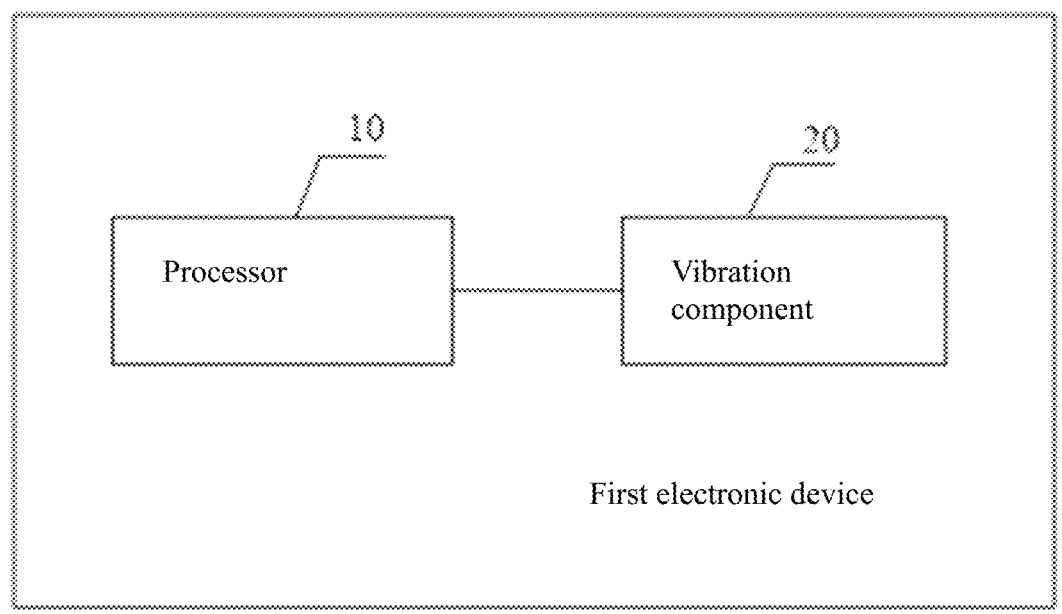
FIG. 10 is a schematic structural diagram of a first electronic device according to the present disclosure.

As shown in FIG. 10, the first electronic device may include the following structures:

A processor 10, which is configured to perform the control methods as described in any of Embodiments 1-8, by executing the instruction set that implements the control methods as described in any of Embodiments 1-8; and A vibration component 20, which is configured to vibrate under the control of the processor 10.

The present disclosure also provides an embodiment of a storage medium, corresponding to the embodiment of the control method provided in this application.

In this embodiment, the storage medium stores a computer program that implements the control method described in any one of Embodiments 1-8. The computer program is executed by the processor, thereby performs the control method described in any one of Embodiments 1-8.

It should be noted that each embodiment in the specification is described in a progressive manner, and each embodiment focuses on the differences from other embodiments, and the same and similar parts between the embodiments can refer to each other.

Finally, it should be noted that in the specification, relational terms such as first, second, third and fourth are only used to distinguish one entity or operation from another entity or operation, and do not necessarily require or imply any such actual relationship or order between these entities or operations. Moreover, the terms "include", "comprise" or any other variant thereof are intended to cover non-exclusive inclusion, so that a process, method, article or device including a series of elements includes not only those elements, but also other elements not explicitly listed, or also includes elements inherent to such a process, method, article or device. In the absence of further limitation, the elements defined by the sentence "including one . . . " do not exclude the existence of other identical elements in the process, method, article or device including the elements.

For the convenience of description, the above system or device is described by function and is divided into various modules or units for separate description. Of course, when implementing the present disclosure, the functions of each unit can be implemented in the same or multiple software and/or hardware.

It can be seen from the description of the above embodiments that a person skilled in the art can clearly understand that the present disclosure can be implemented by means of software plus a necessary general hardware platform. Based on this understanding, the technical solution of the present disclosure, or the part that contributes in addition to the prior art, can be embodied in the form of a software product, which can be stored in a storage medium, such as ROM/RAM, a disk, an optical disk, etc., and includes several instructions for a computer device (which can be a personal computer, a server, or a network device, etc.) to perform the method described in various embodiments or certain parts of the embodiments of the present disclosure.

The above description is merely some embodiments of the present disclosure. It should be pointed out that for ordinary technicians in this technical field, various improvements and modifications can be made without departing from the principles of the present disclosure. These improvements and modifications should also be regarded as the scope of protection of the present disclosure.

What is claimed is:

1. A control method, applied to a first electronic device, the method comprising:
   determining whether a first prerequisite condition is satisfied and controlling a vibration component of a first electronic device to vibrate in a first vibration mode; and
   determining whether a second prerequisite condition is satisfied and controlling the vibration component to vibrate in a second vibration mode, wherein the first vibration mode and the second vibration mode are different, the first vibration mode is based on predefined parameters, and the second vibration mode is at least based on contact parameters between the first electronic device and a second electronic device.

2. The method according to claim 1, further comprising:
   detecting an increase in an amplitude of a first uplink signal between the first electronic device and the second electronic device, wherein the first uplink signal does not carry contact parameters between the first electronic device and the second electronic device; or
   detecting that a pressure value between the first electronic device and the second electronic device is greater than a first threshold and smaller than a second threshold, wherein the second threshold is greater than the first threshold.

3. The method according to claim 2, wherein detecting the increase in the amplitude of the first uplink signal between the first electronic device and the second electronic device includes at least one of:
    detecting the increase in the amplitude of the first uplink signal based on a characteristic value of signal strength from the second electronic device, the characteristic value of signal strength representing a strength of a signal detected by the second electronic device from the first electronic device; or
    detecting the increase in the amplitude of the first uplink signal between the first electronic device and the second electronic device based on the signal transmitted by the second electronic device.

4. The method according to claim 2, wherein detecting the increase in the amplitude of the first uplink signal between the first electronic device and the second electronic device includes:
    determining that there is signal transmission between the first electronic device and the second electronic device, and that the pressure value between the first electronic device and the second electronic device is zero; and
    detecting the increase in the amplitude of the first uplink signal between the first electronic device and the second electronic device.

5. The method according to claim 2, wherein detecting that the pressure value between the first electronic device and the second electronic device is greater than the first threshold and smaller than the second threshold includes:
    determining that the first electronic device has switched from a first state to a second state; and
    detecting that the pressure value between the first electronic device and the second electronic device is greater than the first threshold and smaller than the second threshold, wherein, in the first state, there is no signal transmission between the first electronic device and the second electronic device, and, in the second state, there is signal transmission between the first electronic device and the second electronic device.

6. The method according to claim 1, wherein determining whether the second prerequisite condition is satisfied includes at least one of:
    determining the contact parameters carried by a second uplink signal between the first electronic device and the second electronic device meeting a parameter threshold; and
    detecting that the pressure value between the first electronic device and the second electronic device is greater than the second threshold.

7. The method according to claim 1, further comprising:
    determining that the second prerequisite condition is not satisfied, and canceling the vibration of the vibration component in the first vibration mode, wherein the second prerequisite condition is not satisfied includes:
        when a length of time starting from the start of the vibration component vibrating in the first vibration mode equals to or is more than a preset time threshold, the pressure value between the first electronic device and the second electronic device is not greater than the second threshold; or
        if the contact parameter carried by the second uplink signal between the first electronic device and the second electronic device is less than the parameter threshold.

8. The method according to claim 1, wherein the predefined parameters are obtained by:
    selecting the predefined parameters corresponding to a writing type of the first electronic device from a plurality of predefined parameters, wherein the plurality of predefined parameters corresponds to various writing types of the first electronic device, and different writing types correspond to different writing parameters.

9. An electronic device, comprising a processor configured to execute an instruction set to implement a control method, and a vibration component configured to vibrate under the control of the processor, the method comprising:
    determining whether a first prerequisite condition is satisfied and controlling a vibration component of a first electronic device to vibrate in a first vibration mode; and
    determining whether a second prerequisite condition is satisfied and controlling the vibration component to vibrate in a second vibration mode, wherein the first vibration mode and the second vibration mode are different, the first vibration mode is based on predefined parameters, and the second vibration mode is at least based on contact parameters between the first electronic device and a second electronic device.

10. A non-transitory computer readable storage medium, storing a computer program configured to implement a control method when executed by one or more processors, the control method comprising:
    determining whether a first prerequisite condition is satisfied and controlling a vibration component of a first electronic device to vibrate in a first vibration mode; and
    determining whether a second prerequisite condition is satisfied and controlling the vibration component to vibrate in a second vibration mode, wherein the first vibration mode and the second vibration mode are different, the first vibration mode is based on predefined parameters, and the second vibration mode is at least based on contact parameters between the first electronic device and a second electronic device.

11. The non-transitory computer readable storage medium according to claim 10, wherein the control method further comprises:
    detecting an increase in an amplitude of a first uplink signal between the first electronic device and the second electronic device, wherein the first uplink signal does not carry contact parameters between the first electronic device and the second electronic device; or
    detecting that a pressure value between the first electronic device and the second electronic device is greater than a first threshold and smaller than a second threshold, wherein the second threshold is greater than the first threshold.

12. The non-transitory computer readable storage medium according to claim 11, wherein detecting the increase in the amplitude of the first uplink signal between the first electronic device and the second electronic device includes at least one of:
    detecting the increase in the amplitude of the first uplink signal based on a characteristic value of signal strength from the second electronic device, the characteristic value of signal strength representing a strength of a signal detected by the second electronic device from the first electronic device; or
    detecting the increase in the amplitude of the first uplink signal between the first electronic device and the second electronic device based on the signal transmitted by the second electronic device.

13. The non-transitory computer readable storage medium according to claim 11, wherein detecting the increase in the amplitude of the first uplink signal between the first electronic device and the second electronic device includes:
    determining that there is signal transmission between the first electronic device and the second electronic device, and that the pressure value between the first electronic device and the second electronic device is zero; and
    detecting the increase in the amplitude of the first uplink signal between the first electronic device and the second electronic device.

14. The non-transitory computer readable storage medium according to claim 11, wherein detecting that the pressure value between the first electronic device and the second electronic device is greater than the first threshold and smaller than the second threshold includes:
    determining that the first electronic device has switched from a first state to a second state; and
    detecting that the pressure value between the first electronic device and the second electronic device is greater than the first threshold and smaller than the second threshold, wherein, in the first state, there is no signal transmission between the first electronic device and the second electronic device, and, in the second state, there is signal transmission between the first electronic device and the second electronic device.

15. The non-transitory computer readable storage medium according to claim 10, wherein determining whether the second prerequisite condition is satisfied includes at least one of:
    determining the contact parameters carried by a second uplink signal between the first electronic device and the second electronic device meeting a parameter threshold; and
    detecting that the pressure value between the first electronic device and the second electronic device is greater than the second threshold.

16. The non-transitory computer readable storage medium according to claim 10, wherein the control method further comprises:
    determining that the second prerequisite condition is not satisfied, and canceling the vibration of the vibration component in the first vibration mode, wherein the second prerequisite condition is not satisfied includes:
    when a length of time starting from the start of the vibration component vibrating in the first vibration mode equals to or is more than a preset time threshold, the pressure value between the first electronic device and the second electronic device is not greater than the second threshold; or
    if the contact parameter carried by the second uplink signal between the first electronic device and the second electronic device is less than the parameter threshold.

17. The non-transitory computer readable storage medium according to claim 10, wherein the predefined parameters are obtained by:
    selecting the predefined parameters corresponding to a writing type of the first electronic device from a plurality of predefined parameters, wherein the plurality of predefined parameters corresponds to various writing types of the first electronic device, and different writing types correspond to different writing parameters.

* * * * *